Feb. 8, 1949. H. W. SCHWARZ 2,460,847
IMPLEMENT BALANCE CONTROL LINK SPRING
Filed April 12, 1946 2 Sheets-Sheet 1
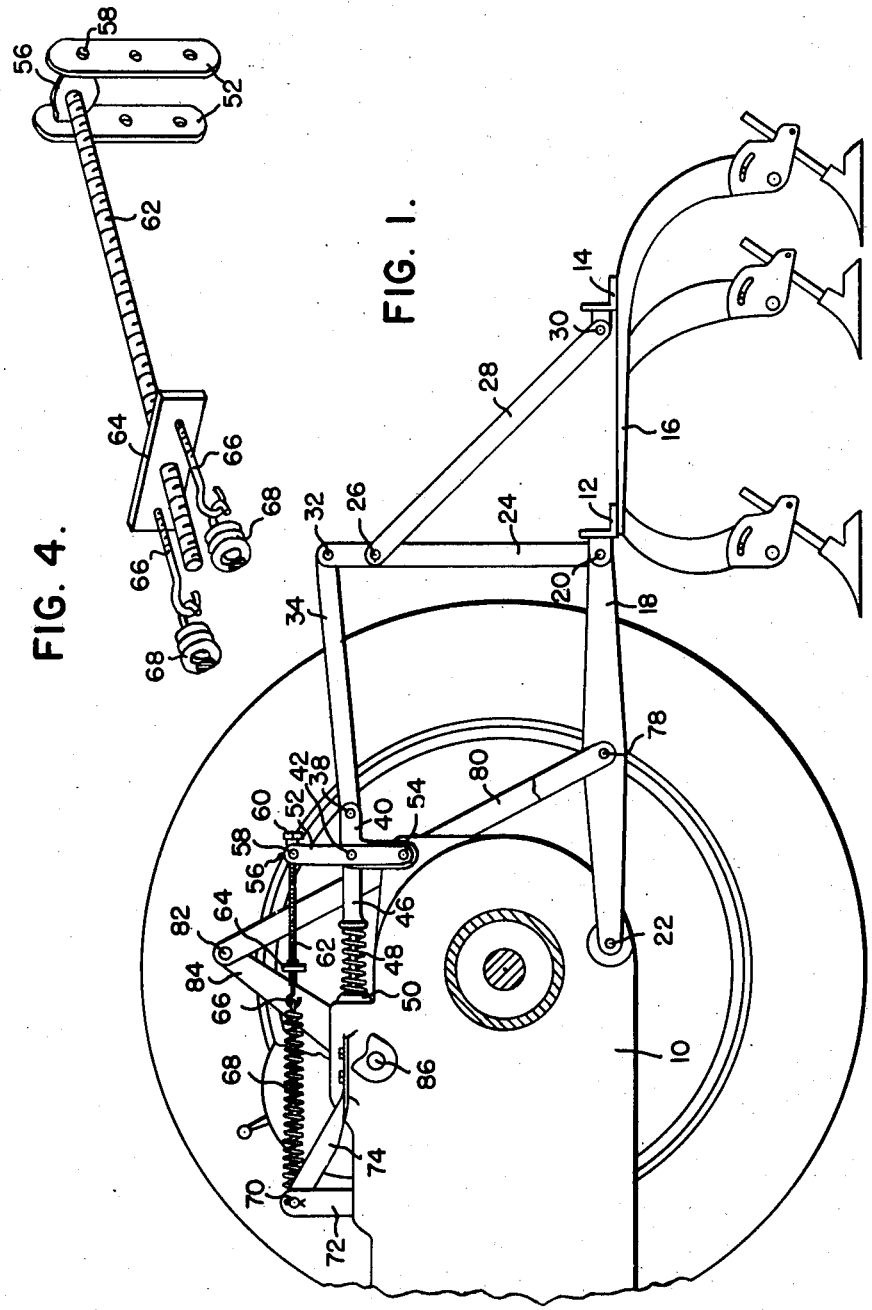
INVENTOR.
HAROLD W. SCHWARZ,

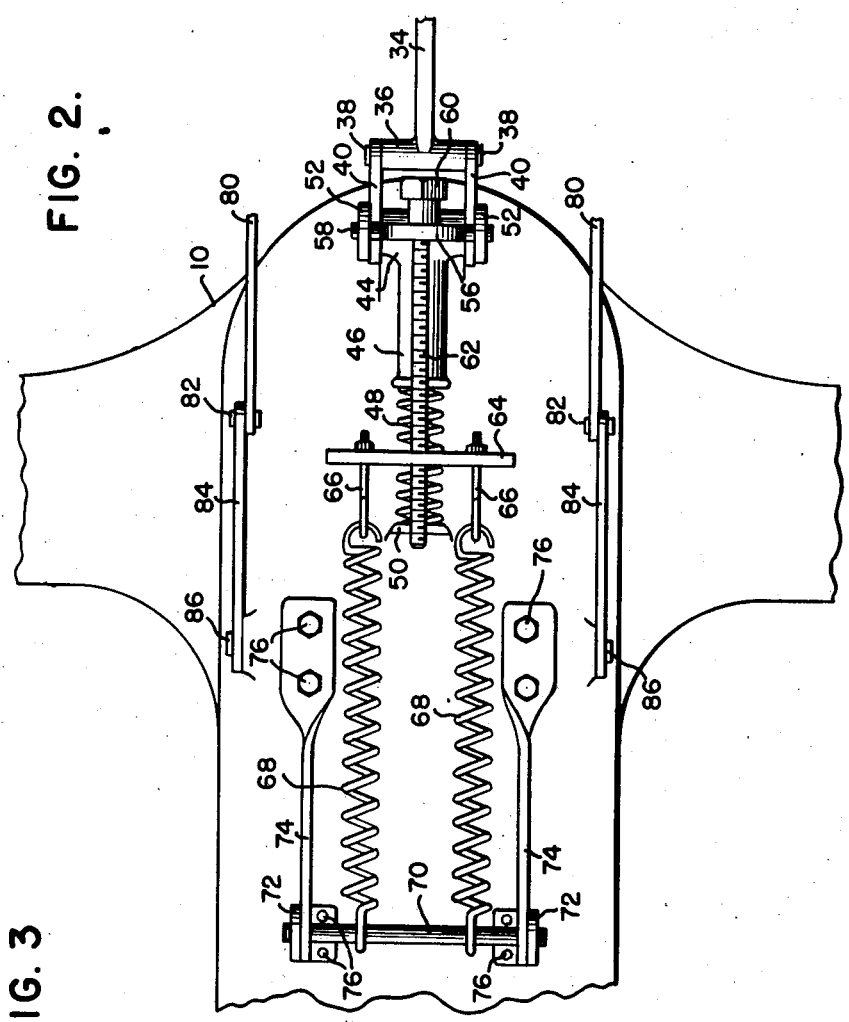
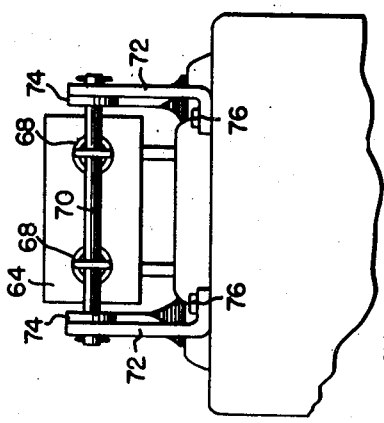

Patented Feb. 8, 1949

2,460,847

UNITED STATES PATENT OFFICE 2,460,847

IMPLEMENT BALANCE CONTROL LINK SPRING

Harold W. Schwarz, Mercedes, Tex.

Application April 12, 1946, Serial No. 661,834

1 Claim. (Cl. 97—50)

This invention relates to an implement balance control link spring which is adapted to be used with and improve the working of the Ford-Ferguson tractor hydraulic attachments system.

With the Ford-Ferguson tractor hydraulic system, the depth of the implements penetrating into the ground is controlled by the weight thereof, and the system operates to adjust the weight of the implement during its operation. The present invention is designed to increase the effective range of the control system to further control the depth of the implements penetrating into the ground in response to the weight of the implement. The invention has been designed to provide two parallel disposed springs which, through their tension, will tend to balance the weight of the implement to permit the implement to more thoroughly and smoothly perform its operation.

The implements which are aided by the structure of the invention being middlebusters, moldboards, discplows, cultivators, planters and all other types of implements needing the smoothly more stabilized action in any soils as sand, clay, black or any other kind of farming soils of similar nature.

The tools stay even with the implement control balance link spring without needless seesawing action. Even in cultivating among stumps the Ferguson system when used with this device rises quicker and returns to the same working level set before striking the stumps.

An object of the invention is to provide a device that is simple in construction and can be adjusted for light or heavy implements, efficient in operation since it compensates to a great extent for the bearing weight of the implement on the tractor, thus performing a more successful operation, is durable and economical to manufacture.

With the above and other objects and advantages in view the invention consists of the novel details of construction, arrangement and combination of parts more fully hereinafter described, claimed and illustrated in the accompanying drawings in which:

Figure 1 is a side elevation of the device in use with the Ford Ferguson system as applied to a tractor and farming implement;

Figure 2 is a top plan view thereof;

Figure 3 is a front view of Figure 2 and

Figure 4 is a perspective view of an embodiment of the invention.

Referring more in detail to the drawings the reference numeral 10 designates a tractor and 12 and 14 the transverse frame members of the cultivator 16.

The links 18 are pivotally connected to the frame member 12 at 20 and to the tractor at 22 and the upstanding link 24 is pivoted to the member 12 at the center thereof. To the link 24 adjacent its upper end is pivotally connected at 26 the links 28 which at their other ends are pivotally connected to the member 14 at 30.

Pivotally connected to the upper end of the link 24 at 32 is a forwardly extending link 34 having a bearing end 36 pivotally connected at 38 to parallel bell crank levers 40 which are pivotally connected at 42 to the bearing end 44 of the spring arm 46 and to the tractor at 54 and the spring end 48 of arm 46 is connected to the tractor at 50.

Parallel upstanding links 52 are also secured to the tractor at 54 and also secured to the arm 46 at 42 and are provided at their upper ends with the swiveled disc 56 which is swivelled by means of the lugs 58. The disc is apertured to receive the headed end 60 of the adjusting bolt 62 on which is threadably mounted the plate 64 having hook bolts 66 connected at their outer ends thereof, to which are connected the parallel coil springs 68 connected at their forward ends to the rod 70 mounted in brackets 72 and rearwardly extending brace arms 74, the brackets and arms being connected to the tractor by fasteners 76.

Pivotally connected at 78 to the center of the links 18 are the upstanding links 80 which are pivotally connected at 82 to the inclined links 84 which at their other ends are pivotally connected at 86 to the tractor 10.

The bolt 62 can be adjusted to tension the springs 68 according to the weight of the implement used, thus the weight of the implement can be nullified, and a more efficient task can be performed. The springs will act to balance the weight of the implement, thus aiding the spring arm or master arm 46 to more efficiently perform its task.

It is believed that the construction and operation of the device will be apparent to those skilled in the art and it is to be understood that changes in the details of construction, arrangement and combination of parts, may be resorted to provided they fall within the spirit of the invention and the scope of the appended claim.

Having thus described the invention what is claimed as new and desired to be secured by Letters Patent is:

A device of the character described for varying the compression in a balance spring of a hydraulic linkage system for a tractor, comprising a pair of vertically disposed parallel links connected to said linkage system, a disc pivotally mounted between said links, an adjusting screw mounted in said disc, a plate threadably mounted on said screw, hook bolts carried by said plate on opposite sides of said screw, parallel springs connected at one end to said hooks and at the other end to the tractor, said links being connected to the hydraulic linkage system rearwardly of the connection of said springs to the tractor.

HAROLD W. SCHWARZ.

REFERENCES CITED

The following references are of record in the file of this patent:

UNITED STATES PATENTS

| Number | Name | Date |
| --- | --- | --- |
| 2,405,980 | Sands et al. | Aug. 20, 1946 |
| 2,414,114 | Martin | Jan. 14, 1947 |